(12) United States Patent
Fehrenbach et al.

(10) Patent No.: US 10,001,558 B2
(45) Date of Patent: Jun. 19, 2018

(54) DETERMINING A LEVEL AND FLOW SPEED OF A MEDIUM

(71) Applicant: VEGA Grieshaber KG, Wolfach (DE)

(72) Inventors: Josef Fehrenbach, Haslach (DE);
Juergen Motzer, Gengenbach (DE);
Daniel Schultheiss, Hornberg (DE)

(73) Assignee: VEGA GRIESHABER KG, Wolfach (DE)

( * ) Notice: Subject to any disclaimer, the term of this patent is extended or adjusted under 35 U.S.C. 154(b) by 0 days. days.

(21) Appl. No.: 15/379,054

(22) Filed: Dec. 14, 2016

(65) Prior Publication Data

US 2017/0089748 A1    Mar. 30, 2017

Related U.S. Application Data

(63) Continuation of application No. 14/323,737, filed on Jul. 3, 2014, now Pat. No. 9,551,606.

(30) Foreign Application Priority Data

Jul. 8, 2013 (DE) .................... 10 2013 213 346

(51) Int. Cl.
*G01S 13/58* (2006.01)
*G01P 5/24* (2006.01)
(Continued)

(52) U.S. Cl.
CPC .......... *G01S 13/584* (2013.01); *G01F 1/002* (2013.01); *G01F 1/663* (2013.01); *G01F 23/284* (2013.01); *G01P 5/242* (2013.01); *G01F 1/007* (2013.01)

(58) Field of Classification Search
CPC ............................. G01S 13/32; G01S 13/343
See application file for complete search history.

(56) References Cited

U.S. PATENT DOCUMENTS 5,315,880 A * 5/1994 Bailey ................... G01F 1/002
324/642
5,420,591 A * 5/1995 Annee .................. G01F 23/284
342/124

(Continued)

FOREIGN PATENT DOCUMENTS

| CN | 1442674 | 9/2003 |
|---|---|---|
| CN | 1662793 | 8/2005 |

(Continued)

OTHER PUBLICATIONS

English Language Machine Translation of DE 3223393, 2 pgs. obtained online at <http://worldwide.espacenet.com/> on Mar. 20, 2017.*

(Continued)

*Primary Examiner* — Harshad R Patel
*Assistant Examiner* — Punam Roy
(74) *Attorney, Agent, or Firm* — Fay Kaplun & Marcin, LLP (57) ABSTRACT

A measurement device is provided for determining a distance of the measurement device from a medium and a flow speed of a medium by evaluating a transmission signal emitted by the fill level measurement device and reflected by the medium. The measurement device includes an antenna arrangement for emitting the transmission signal in two different directions. The flow speed of the medium can be determined using the Doppler shift of the transmission signal.

12 Claims, 4 Drawing Sheets

(51) Int. Cl.
*G01F 23/284* (2006.01)
*G01F 1/00* (2006.01)
*G01F 1/66* (2006.01)

(56) References Cited

U.S. PATENT DOCUMENTS

| | | | | |
|---|---|---|---|---|
| 5,675,259 A * | 10/1997 | Arndt | ............ | G01F 1/66 324/642 |
| 5,684,250 A * | 11/1997 | Marsh | ............ | G01F 1/002 702/100 |
| 5,751,240 A * | 5/1998 | Fujita | ............ | G01S 13/34 342/107 |
| 5,796,679 A | 8/1998 | Yankielun | | |
| 5,811,688 A * | 9/1998 | Marsh | ............ | E03F 7/00 73/227 |
| 5,815,112 A * | 9/1998 | Sasaki | ............ | G01S 13/87 342/113 |
| 6,184,819 B1 * | 2/2001 | Adomat | ............ | G01S 13/48 342/107 |
| 6,317,073 B1 * | 11/2001 | Tamatsu | ............ | G01S 7/352 342/109 |
| 6,320,531 B1 * | 11/2001 | Tamatsu | ............ | G01S 13/343 342/109 |
| 6,650,280 B2 * | 11/2003 | Arndt | ............ | G01F 23/284 342/124 |
| 7,228,728 B2 * | 6/2007 | Ouriev | ............ | G01F 1/663 73/54.01 |
| 7,571,656 B2 * | 8/2009 | Derevyagin | ............ | G01F 1/66 73/861.27 |
| 7,672,797 B2 * | 3/2010 | Petroff | ............ | G01F 1/663 702/100 |
| 7,714,771 B2 * | 5/2010 | Lehre | ............ | G01S 7/352 342/104 |
| 7,721,600 B1 * | 5/2010 | Sinclair | ............ | G01F 1/002 73/290 R |
| 7,729,201 B2 * | 6/2010 | Wildey | ............ | G01F 1/66 367/101 |
| 7,861,600 B2 * | 1/2011 | Mayer | ............ | G01F 1/663 73/290 R |
| 8,184,039 B2 * | 5/2012 | Garrod | ............ | G01F 1/002 342/124 |
| 8,378,882 B2 * | 2/2013 | Steffens | ............ | G01S 7/352 342/104 |
| 8,881,603 B2 * | 11/2014 | Ueberschlag | ............ | G01F 1/667 73/861.25 |
| 9,151,650 B2 * | 10/2015 | Tsao | ............ | G01P 5/00 |
| 9,677,922 B2 * | 6/2017 | Skowaisa | ............ | G01S 13/34 |
| 2003/0185101 A1 * | 10/2003 | Wildey | ............ | G01F 1/663 367/101 |
| 2004/0006436 A1 * | 1/2004 | Morgen | ............ | G01F 1/663 702/48 |
| 2006/0109169 A1 * | 5/2006 | Winter | ............ | G01S 13/345 342/70 |
| 2007/0165488 A1 * | 7/2007 | Wildey | ............ | G01F 1/66 367/101 |
| 2008/0143583 A1 * | 6/2008 | Welle | ............ | G01F 23/284 342/124 |
| 2008/0250870 A1 * | 10/2008 | Rhodes | ............ | G01F 1/66 73/861.27 |
| 2009/0251360 A1 * | 10/2009 | Uebo | ............ | G01S 13/32 342/129 |
| 2009/0309785 A1 * | 12/2009 | Nalezinski | ............ | G01S 7/021 342/200 |
| 2010/0031753 A1 * | 2/2010 | Mayer | ............ | G01F 1/663 73/861 |
| 2010/0060512 A1 * | 3/2010 | Garrod | ............ | G01F 1/002 342/124 |
| 2010/0257930 A1 * | 10/2010 | Isenmann | ............ | G01F 15/063 73/273 |
| 2011/0211644 A1 * | 9/2011 | Larocque | ............ | G01S 7/4017 375/259 |
| 2012/0079890 A1 * | 4/2012 | Ueberschlag | ............ | G01F 1/667 73/861.27 |
| 2012/0130509 A1 * | 5/2012 | Altendorf | ............ | G01F 23/296 700/30 |
| 2012/0169528 A1 * | 7/2012 | Edvardsson | ............ | G01F 23/284 342/124 |
| 2013/0000416 A1 * | 1/2013 | Croft | ............ | G01F 1/002 73/861.18 |
| 2013/0041600 A1 * | 2/2013 | Rick | ............ | G01F 1/663 702/50 |
| 2014/0000360 A1 * | 1/2014 | Barton | ............ | G01F 1/002 73/215 |
| 2014/0085132 A1 * | 3/2014 | Jirskog | ............ | G01F 23/284 342/124 |
| 2014/0340259 A1 * | 11/2014 | Fehrenbach | ............ | G01S 13/02 342/359 |
| 2015/0007654 A1 * | 1/2015 | Fehrenbach | ............ | G01P 5/00 73/198 |
| 2015/0007655 A1 * | 1/2015 | Skowaisa | ............ | G01S 13/34 73/198 |
| 2015/0015431 A1 * | 1/2015 | Trotta | ............ | G01S 7/03 342/21 |
| 2015/0033844 A1 * | 2/2015 | Chen | ............ | G01F 23/284 73/290 V |
| 2015/0035695 A1 * | 2/2015 | Lin | ............ | G01F 23/284 342/124 |
| 2015/0153447 A1 * | 6/2015 | Lee | ............ | G01S 13/32 342/27 |
| 2015/0323660 A1 * | 11/2015 | Hampikian | ............ | G01S 13/58 342/109 |
| 2016/0139264 A1 * | 5/2016 | Larocque | ............ | G01S 7/023 367/101 |

FOREIGN PATENT DOCUMENTS

| | | |
|---|---|---|
| CN | 1926409 | 3/2007 |
| CN | 101907472 | 12/2010 |
| CN | 202304908 | 7/2012 |
| DE | 3223393 | * 12/1983 |
| DE | 102008036963 | 2/2010 |
| DE | 102010044182 | 6/2012 |
| DE | 102012011165 | 12/2013 |
| EP | 1431724 | 6/2004 |
| EP | 2388614 | 11/2011 |
| JP | H102779 | 1/1998 |
| JP | 3012522 | 2/2000 |
| JP | 2011064677 | 3/2011 |

OTHER PUBLICATIONS

Laenen, Antonius, and Russell Emmett Curtis. Accuracy of acoustic velocity metering systems for measurement of low velocity in open channels. Department of the Interior, US Geological Survey, 1989.*

* cited by examiner

DETERMINING A LEVEL AND FLOW SPEED OF A MEDIUM

REFERENCE TO RELATED APPLICATIONS

The present application is a Continuation of U.S. patent application Ser. No. 14/323,737 filed on Jul. 3, 2014, now U.S. Pat. No. 9,551,606, which claims the benefit of DE Patent Appln. Serial No. 10 2013 213 346.4 filed on Jul. 8, 2013. Specifications of the above applications/patents are expressly incorporated herein, in their entirety, by reference.

FIELD OF THE INVENTION

The invention relates to measuring the flow speed and level of flowing liquids. In particular, the invention relates to a fill level measurement device for determining a distance from a medium and a flow speed of the medium by evaluating a transmission signal emitted by the fill level measurement device and reflected by the medium, to a method for determining a distance from a medium and a flow speed of the medium, to a program element and to a computer-readable medium.

BACKGROUND

Measurement devices for measuring the distance between the sensor and the surface of a medium (in other words the "fill level" or level) and the flow speed and flow direction of the medium are known which consist of two different measurement systems for detecting the distance (measurement system 1) and the flow speed (measurement system 2).

The distance is detected by way of a pulsed radar system. By contrast, the flow speed is determined by a different system which uses Doppler evaluation of a constant transmission signal, also known as a CW signal, CW standing for continuous wave.

SUMMARY OF THE INVENTION

A first aspect of the invention relates to a distance measurement device, for example a fill level measurement device, which is configured to determine a distance of the fill level measuring device from a medium and a flow speed of the medium by evaluating a transmission signal emitted by the measurement device and reflected by the medium. This is thus a contact-free measurement using propagated electromagnetic or sound waves.

The measurement device comprises a signal generator module which generates the transmission signal to be emitted. An antenna arrangement is further provided, and is configured to emit the transmission signal in a first direction perpendicular to the flow direction of the medium and in a second direction different from the first direction. For example, the second direction may be at an angle α, which is between 0 degrees and 90 degrees and for example between 30 degrees and 60 degrees, for example approximately 45 degrees, to the flow direction of the medium and thus to the surface thereof.

Further, the measurement device comprises a processor unit for determining the distance from the medium and the flow speed of the medium by evaluating the transmission signal reflected by the medium and received by the antenna arrangement.

The transmission signal can be emitted in the two directions in various ways. For example, it may be provided that one part of the transmission signal is emitted in the first direction and simultaneously a second part of the transmission signal is emitted in the second direction. It may also be provided that initially the entire transmission signal is emitted in the first direction and temporally subsequently the transmission signal is fully emitted in the second direction. This can take place by way of a switching process in the measurement process, as described in greater detail below.

In one embodiment of the invention, the antenna arrangement is a single antenna having two or more radiation directions. This may be a planar antenna or else an array of individual antennas, which is formed in such a way that there are two (or more) primary radiation directions in which the transmission signal is emitted.

It may also be provided that the antenna arrangement can be rotated with respect to a housing region of the measurement device, which region is provided for fixing the measurement device on a support, in such a way that the antenna arrangement can be orientated optimally with respect to the flow direction of the liquid without the measurement device itself having to be orientated for this purpose.

In a further embodiment of the invention, the antenna arrangement comprises a first antenna and a second antenna, the first antenna being configured to emit the transmission signal in the first direction and the second antenna being configured to emit the transmission signal in the second direction.

In a further embodiment of the invention, the two antennas are both connected to the signal generator module via a single directional coupler, a single switch or a single power splitter.

In a further embodiment of the invention, the signal generator module is a high-frequency module, for example an FMCW (frequency-modulated continuous wave) module. At least a first part of the transmission signal is a frequency-modulated continuous wave signal (FMCW).

It may be provided that the FMCW module can change the signal generation mode thereof, in such a way that as well as an FMCW transmission signal it can also generate a CW transmission signal of the same shape.

In this case, the transmission signal thus comprises a second part, which is a continuous wave signal (CW), the fill level measurement device being configured to emit the first part of the transmission signal only in the first direction and the second part of the transmission signal (CW) only in the second direction.

In a further embodiment of the invention, the FMCW module is configured to generate a frequency-modulated transmission signal, which has a rising and a falling frequency ramp. As a result, it is possible to measure distances and speeds simultaneously. The rising and the falling flanks of a triangular modulation of this type have a Doppler shift in a different direction. Signal processing takes place for example only after a brief pause after the inflection points of the transmitted frequency modulation.

The use of a triangular modulation shape provides the possibility of detecting the Doppler frequency as a measure of a radial speed as an independent measurement value aside from the distance measurement. The receiving frequency increases during approach and thus decreases the value of the difference frequency during the rising frequency ramp. As a result of the superposition with the Doppler frequency, the frequency difference when measuring an approach in the rising flank of the triangular modulation is smaller, and in the falling flank it is larger by the same amount, than for a stationary reflector. For the opposite flow direction (in other words away from the sensor), the receiving frequency decreases and thus increases the difference frequency during the rising frequency ramp. Equivalently, the difference frequency decreases in the falling ramp. If the gradient of the frequency change is equal in size in the rising and falling flanks of the triangular signal, the average of the difference frequencies from the two measurement periods is a measure of distance, independent of the speed. The sum of the difference frequencies is a measure of the half radial speed of the object.

By evaluating the direction of the frequency shift for the increasing and the falling frequency ramp, the flow direction can additionally be determined.

In general, there are high requirements on the linearity of the frequency change.

In a further embodiment of the invention, the processor unit is configured to determine the distance from the medium and the flow speed of the medium within a single measurement cycle.

It should be noted that in all the embodiments of the invention, it may be provided that the transmission signal is generated by the same signal generator module irrespective of whether it is emitted perpendicular to the flow direction of the medium and/or obliquely to the flow direction of the medium. In particular, it may also be provided that the received, reflected transmission signals are evaluated by the same processor unit. The distance can be determined from the transmission signal emitted in the first direction after it has been reflected on the surface of the filling medium and the flow speed of the medium can be determined from the transmission signal emitted in the second direction.

The flow speed and the distance of the fill level measurement device from the medium can be determined by a single measurement in which the transmission signal is emitted in the first direction perpendicular to the flow direction of the medium and, before this, after this or simultaneously, is emitted in the second direction obliquely to the flow direction of the medium.

The transmission signal is accordingly initially emitted in two different directions, followed by an evaluation of the corresponding signals reflected on the surface of the filling medium, which signals make it possible to determine the flow speed and the distance (i.e. the fill level or level).

In addition to the simultaneous emission of the transmission signal in the two different directions, it is also possible to initially emit the transmission signal in the first direction and subsequently in the second direction (or vice versa).

Distance and flow speed can be determined sequentially or in parallel, depending on the embodiment of the fill level measurement device.

It may also be provided that the measurement cycle is defined as follows. The distance is measured repeatedly by transmission signals which are in succession over time being emitted in the first direction and the correspondingly reflected signals being evaluated. The transmission signal emitted obliquely to the flow direction of the medium is, however, evaluated less often, for example only after each tenth or twentieth measurement of the distance. This may mean that the transmission signal is also only emitted in the second direction if a certain number of distance measurements has taken place or if a certain amount of time has elapsed since the last determination of flow speed (for example one minute).

It is, however, also possible for the transmission signal to be emitted more often in the second direction, and for the corresponding reflected signal, which is received from this direction by the antenna arrangement, to however only also be evaluated (to determine the flow speed) if a certain number of fill level measurements has taken place or if a certain amount of time has elapsed since the last determination of flow speed (for example one or two minutes).

It may accordingly be provided that the determination of the flow speed is triggered by a certain event. In this context, as already described, said event may be a certain number of distance measurements being carried out and/or a certain amount of time elapsing since the last determination of flow speed. Alternatively or additionally, the event triggering the determination of flow speed may also be constituted by the level (that is to say the "distance") having changed by more than a predetermined threshold value over a predetermined period of time. In other words, in this embodiment, a measurement of flow speed is triggered if the distance changes sufficiently rapidly.

In a further embodiment of the invention, the measurement device is a fill level radar or another fill level measurement device.

A further aspect of the invention provides a method for determining a distance of a fill level measuring device from a medium and a flow speed of the medium by evaluating a transmission signal emitted from a measurement device and reflected by the medium. The method comprises the following steps: generating a transmission signal; emitting the transmission signal in a first direction perpendicular to the flow direction of the medium and in a second direction different from the first direction; determining the distance from the medium and the flow speed of the medium by evaluating the transmission signal reflected by the medium and received by the antenna arrangement.

A further aspect of the invention provides a program element which, when executed on a processor unit of a fill level measurement device, causes the fill level measurement device to carry out the method steps described above and below.

A further aspect of the invention provides a computer-readable medium on which a program element is stored which, when executed on a processor unit of a fill level measurement device, causes the fill level measurement device to carry out the method steps described above and below.

In particular, the measurement device may be configured for connection to a 4-20 mA two-wire line, via which it is supplied with power for the measurement operation and can simultaneously transmit a measurement value which is proportional to the flowing current.

In the following, embodiments of the invention are described with reference to the drawings, in which like reference numerals denote like or similar elements. However, like or similar elements may also be denoted by different reference numerals.

DETAILED DESCRIPTION OF EMBODIMENTS

The drawings are schematic and not to scale.

Figure 1:
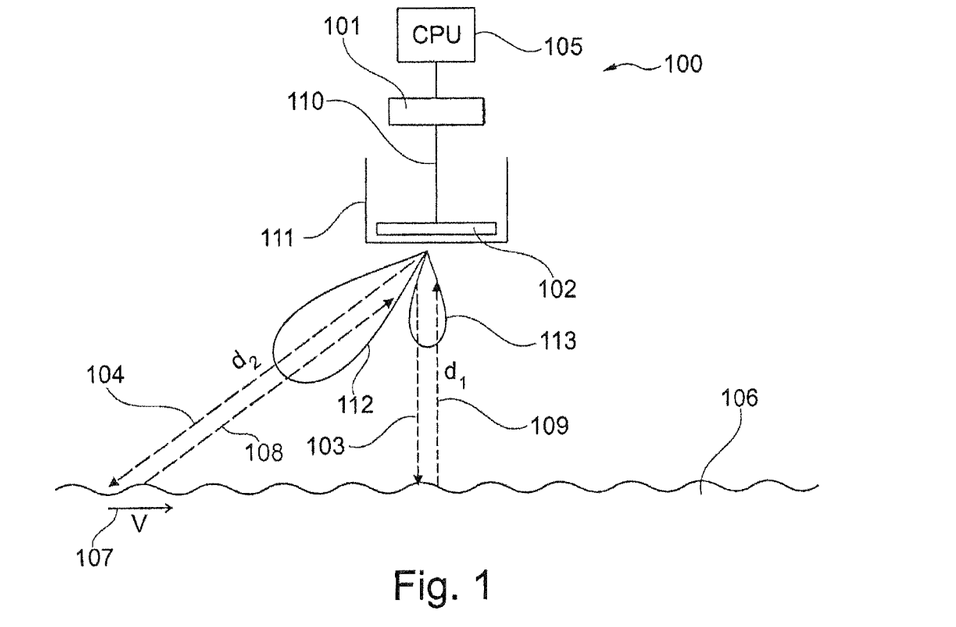
FIG. 1 shows a measurement device in accordance with an embodiment of the invention.

FIG. 1 shows a measurement device 100 in accordance with an embodiment of the invention. The measurement device is a distance measurement device, for example in the form of a fill level radar.

The measurement of the flow speed of the medium, which is a fluid, and of the distance from the sensor 100 are combined in a single measurement system, for example an FMCW radar system. The measurement device comprises either two antennas (cf. FIG. 2) or a single antenna, the radiation characteristic of which is adapted in such a way that a first part of the transmission signal (in other words one beam of the transmission signal) can be used for distance measurement and a second part (second beam of the transmission signal) can be used for flow speed measurement (cf. FIG. 1).

Figure 2:
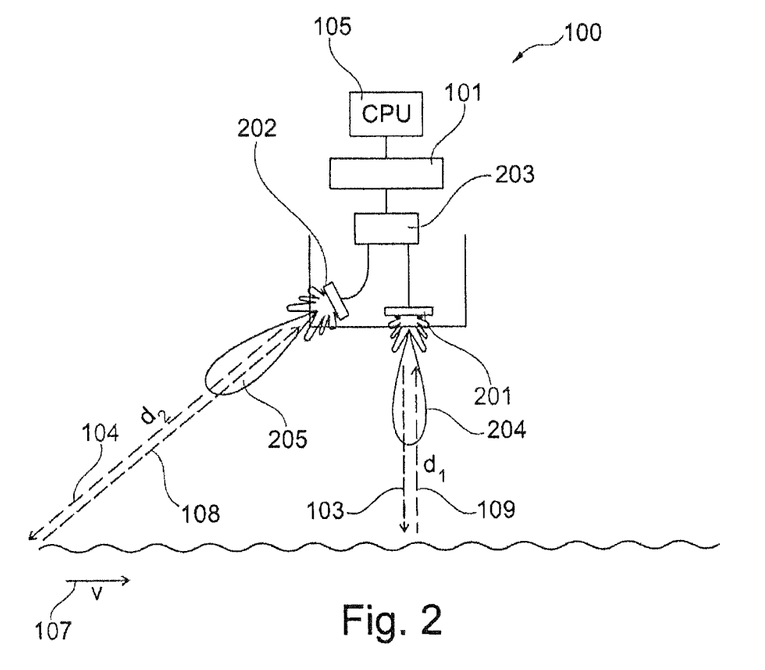
FIG. 2 shows a measurement device in accordance with a further embodiment of the invention.

If two antennas are used, the distance or the flow speed of the medium can be measured alternately by means of a switch.

If the two antennas are connected to the transmission signal generator module (for example an HF module) together via a directional coupler or a power splitter, the two measurements can be taken simultaneously, since the transmission signal is actually emitted in both directions simultaneously.

This results in a simple installation for measuring the distance from a surface of the medium and for simultaneously measuring the flow speed and optionally also the flow direction of the medium. The flow throughput can also be determined using a measurement device of this type if the geometry of the flow bed of the liquid is known.

The measurement device 100 comprises a processor unit 105, which is connected to the HF module 101 (transmission signal generator unit). The HF module is connected to a planar antenna 102 via the signal line 110. The planar antenna 102 is located in a housing 111 and it may be provided that the antenna can be rotated counter to the HF module.

The antenna 102 emits a transmission signal 112, 113, a relatively large portion of the transmission signal being directed in a direction 104 oblique to the flow speed 107 of the fluid 106. At least part of this obliquely emitted signal portion is reflected by the surface of the flowing fluid and returned to the antenna 102 in the direction 108. The antenna 102 subsequently receives this reflected signal portion of the transmission signal.

It is advantageous for measuring the flow speed if the surface of the fluid 106 has a wave formation or rippling.

At the same time, a second, for example smaller signal portion 113 is emitted perpendicular to the flow speed 107 of the fluid 106 in the direction 103, reflected on the surface of the fluid and radiated back to the antenna in the opposite direction 109. The antenna 102 subsequently receives this signal portion of the reflected transmission signal.

Subsequently, from the received, reflected transmission signal portions, an echo curve is generated from which the distance $d_1$, which is the shortest distance between the sensor 100 and the fluid 106, and the distance $d_2$, which is the path length covered by the obliquely emitted transmission signal in the direction 104 before it is reflected on the fluid surface, are generated.

The distance $d_1$ is calculated by evaluating the signal portion of the transmission signal reflected perpendicular to the surface of the fluid, and the flow speed is determined by a Doppler evaluation of the signal portion emitted obliquely with respect to the flow direction 107.

The primary radiation direction of the antenna can be used for measuring the flow speed, whilst the distance is detected using the secondary lobe.

It may also be provided that the antenna comprises two foci for the radiation, in other words two primary radiation directions. This can be achieved for example using a patch array which radiates in two defined directions, as shown in FIG. 1. The directivity for the distance measurement may turn out smaller in this case, since better reflection properties are to be expected (as a result of the orientation of the radiation direction 103 perpendicular to the surface of the medium).

The evaluation may take place in a measurement cycle. The first echo (which corresponds to the shortest distance between the sensor and the fluid surface) gives the distance; from the echo further away, the speed and the flow direction can be determined.

FIG. 2 shows a measurement device in accordance with a further embodiment of the invention. By contrast with the embodiment of FIG. 1, two antennas 201, 202 are provided, and are each connected via their own signal line to a directional coupler, a power splitter or a switch 203 which connects the two antennas to the HF module 101.

An FMCW module for both measurements (distance and flow speed) is thus provided, and is coupled to a respective antenna for the distance measurement and another antenna for the flow speed via a switch, a power splitter or a directional coupler. One of the two antennas in each case can be selected for measurement using the switch.

In this way, alternating measurements of distance and flow speed are possible. Switching between the two measurement methods takes place on the HF signal path between the antennas and the HF module.

The HF module may also, as described above, be connected to the two antennas via a directional coupler or power splitter 203, as is shown schematically in FIG. 2 in any case. In this case, an optimised antenna is used for each of the two measurements. The antenna 201 emits the transmission signal perpendicular to the flow direction 107, and this is represented by the transmission lobe 204. The second antenna 202, which is arranged obliquely with respect to the first antenna 201, emits the transmission signal in the oblique direction 104, and this is represented by the transmission lobe 205.

By using two separate antennas, larger amplitudes of the two received signals can be achieved. The evaluation takes place as in the other embodiments.

Figure 3:
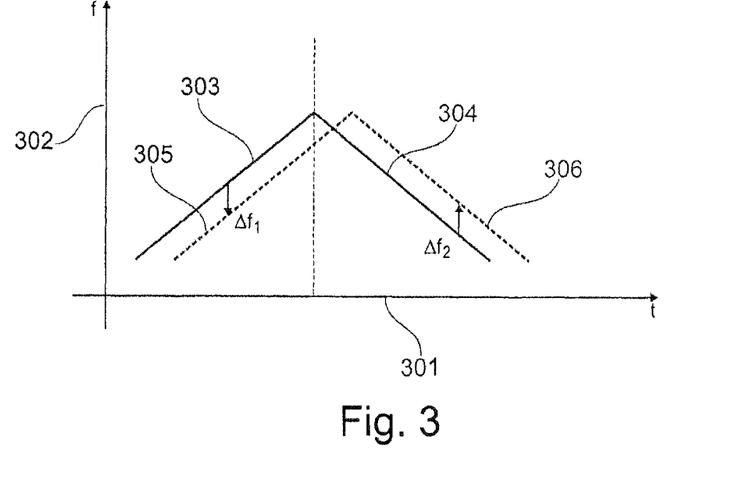
FIG. 3 shows a measurement signal and a received signal in accordance with an embodiment of the invention.

To determine the distance and the flow speed or flow direction, it may be provided that two frequency ramps are passed through in accordance with generally known FMCW radar methods. The horizontal axis 301 denotes the time t and the vertical axis 302 denotes the frequency f.

The first ramp is for example increasing in frequency, starting at the frequency f1 and ending at the frequency f2. Subsequently, the falling second ramp starts at t2 and ends at the frequency f1 (cf. FIG. 3). The first ramp is denoted by reference numeral 303 and the second ramp by reference numeral 304.

The curve 305, 306, which is displaced to the right, reproduces the received signal received by the antenna arrangement (transmission signal reflected by the filling material surface).

The transmission signal reflected by the filling material surface is sampled using an analogue-digital converter and transformed into the frequency range in a microprocessor using a fast Fourier transform (FFT).

Figure 4:
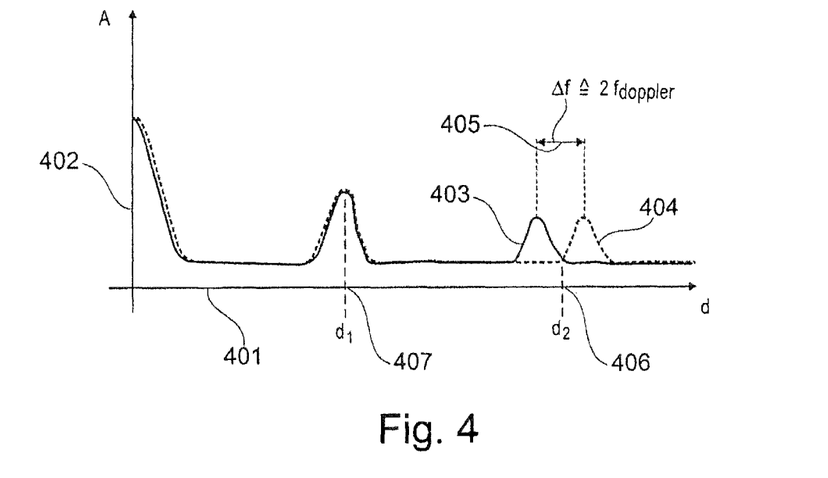
FIG. 4 shows FFT-transformed signals at the receiver output of ramp 1 and ramp 2.

This results in two spectra, which are shown in FIG. 4.

In this context, the horizontal axis 401 denotes the distance d between the sensor and the corresponding reflector, and the vertical axis 402 denotes the amplitude of the received signal.

The first echo 407 at the location $d_1$ (shortest distance) specifies the distance d1 from the medium; from the echoes further away in the vicinity of the location 406, the speed of the medium and the flow direction thereof can be detected.

The reflection from the distance measurement gives the same difference frequency between the transmitted and received signals for both ramps.

The reflection from the obliquely incident signal, which was emitted in direction 104 (cf. FIGS. 1 and 2), is used to determine the flow speed and is shifted in frequency by $f_{Doppler}$ as a result of the Doppler effect. This results in different difference frequencies in the rising and falling ramps. These differ by $2 \times f_{Doppler}$, as can be seen at the peaks 403, 404. One peak 403, which is shifted to the left with respect to the actual distance $d_2$, results from the received signal of the rising frequency ramp 303 (cf. FIG. 3), and the peak signal 404 shifted to the right results from the received signal of the falling frequency ramp 306.

The arrow 405 represents the frequency difference Δf between the two peaks, which is twice the Doppler shift.

The rising and falling flanks of the triangular modulation have a different Doppler shift direction. Signal processing takes place for example only after a brief pause after the inflection points of the transmitted frequency modulation. This is what is known as triangular modulation. The use of a triangular modulation shape provides the possibility of detecting the Doppler frequency as a measure of a radial speed as an independent measurement value aside from the distance measurement. The receiving frequency increases during approach and thus decreases the value of the difference frequency during the rising frequency ramp. As a result of the superposition with the Doppler frequency, the frequency difference when measuring an approach in the rising flank of the triangular modulation is smaller. In the falling flank it is larger by the same amount than for a stationary reflector. If the gradient of the frequency change is equal in size in the rising and falling flanks of the triangular signal, the average of the difference frequencies from the two measurement periods is a measure of distance, independent of the speed. The sum of the difference frequencies is a measure of the half radial speed of the object. In general, there are high requirements on the linearity of the frequency change.

Figure 5:
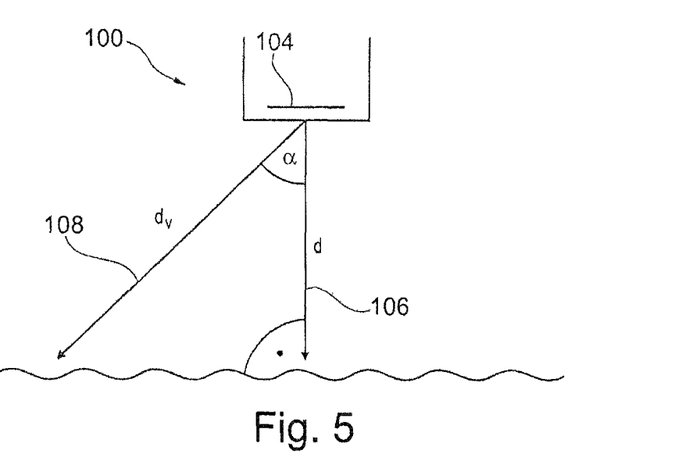
FIG. 5 shows a measurement device in accordance with an embodiment of the invention.

The expected distance for detecting the speed may additionally be calculated from the known angle α between the two antenna radiation directions 103, 104 and the distance from the medium. As a result, in the event of ambiguous echo relationships a measurement window 603 can be produced and a higher measurement reliability can thus be achieved (cf. FIGS. 5 and 6).

Figure 6:
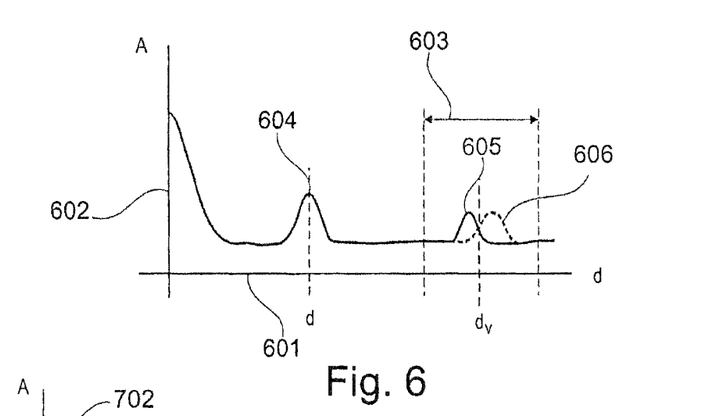
FIG. 6 shows a further FFT-transformed signal at the receiver output of the measurement device.

In FIG. 6, as previously in FIG. 4, the distance d 601 is plotted against the amplitude 602 of the received signal (reflected transmission signal) after it has undergone a Fourier transform. In this case too, the main peak 604, which corresponds to the distance between the sensor and the medium surface, and the two peaks 605, 606, which originate from the obliquely emitted transmission signal, can be seen. These two peaks are inside the measurement window 603.

However, the flow speed of the medium may also be determined in another way. In particular if only one antenna having a primary radiation direction is used, the flow speed can also be measured directly in the reflected signal. In this context, only the echo can be taken into account at the distance d from the surface of the medium.

Since an antenna also always emits and receives portions outside the primary radiation direction, and the sensor thus also measures obliquely with respect to the surface of the medium, signals which are affected by the Doppler frequency due to the movement of the medium are also always present at a receiver of the FMCW radar module.

Figure 7:
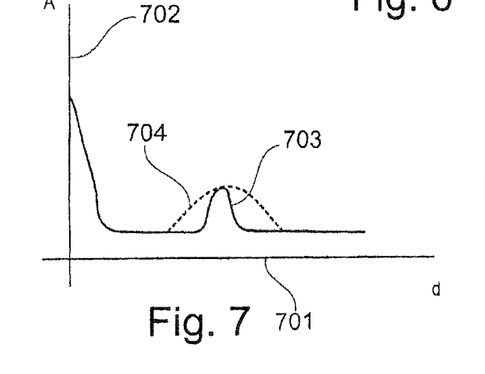
FIG. 7 shows a further FFT-transformed signal at the receiver output of a measurement device.

As a result, the IF signal (intermediate-frequency signal) transformed by FFT has a widening dependent on the flow speed, as is indicated by the peaks 703 and 704 of FIG. 7. As in FIGS. 4 and 6, the horizontal axis 701 denotes the distance and the vertical axis 702 denotes the amplitude. The narrower peak 703 corresponds to a lower flow speed of the medium and the wider peak 704 corresponds to a higher flow speed of the medium.

The flow speed can be determined from this widening. A small widening means a low speed and a large widening means a high speed.

The measurement device may have a corresponding calibration, in such a way that the flow speed can be determined sufficiently precisely by measuring the widening.

If two antennas are used, as is shown in FIG. 2, the flow speed and optionally also the flow direction can be determined using the antenna 204 by the aforementioned method. In a second measurement sequence, likewise using the FMCW method, the fill level can be determined using the antenna 203.

The two values can subsequently be outputted or used to calculate the flow throughput.

Figure 8:
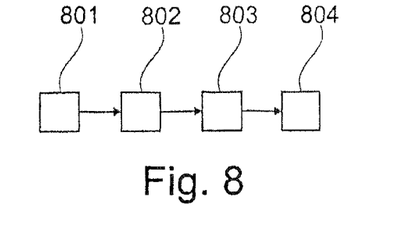
FIG. 8 is a flow chart of a method in accordance with an embodiment of the invention.

FIG. 8 is a flow chart of a method in accordance with an embodiment of the invention. In step 801, a transmission signal is generated by a signal generator module. In step 802, the generated transmission signal is emitted in a first direction, for example perpendicular to the flow direction of the medium, and in a second direction different from the first direction by an antenna arrangement. In step 803, the reflected transmission signal is received by the antenna arrangement, and in step 804, the distance from the medium and the flow speed of the medium are determined by evaluating the transmission signal reflected by the medium and received by the antenna arrangement.

For the sake of completeness, it should be noted that "comprising" and "having" do not exclude the possibility of other elements or steps, and "an" or "a" does not exclude the possibility of a plurality. It should further be noted that features or steps which have been described with reference to one of the above embodiments may also be used in combination with other features or steps of other above-described embodiments. Reference numerals in the claims should not be treated as limiting.

The invention claimed is:
1. A fill level measurement device, comprising:
a signal generator module generating a first transmission signal;
an antenna arrangement including a first antenna and a second antenna, the antenna arrangement emitting the first transmission signal in a first direction perpendicu- lar to a flow direction of a medium and a second direction, the second direction being different from the first direction; and a processor unit configured to determine a distance from the medium by evaluating a second transmission signal, the second transmission signal being generated when the first transmission signal is reflected by the medium and received by the antenna arrangement, and a non-transitory computer-readable medium on which a program element is stored which, when executed by the processor unit, causes the fill level measurement device to:

determine whether the distance to the medium has changed by more than a predetermined threshold value over a predetermined period of time; and determine the flow speed of the medium when the distance to the medium has changed by more than the predetermined threshold value over the predetermined period of time.

2. The fill level measurement device according to claim 1, wherein the first antenna is configured to emit the first transmission signal in the first direction and the second antenna is configured to emit the first transmission signal in the second direction.

3. The fill level measurement device according to claim 2, wherein the first and second antennas are connected to the signal generator module via a directional coupler, a switch or a power splitter.

4. The fill level measurement device according to claim 1, wherein the signal generator module is a frequency-modulated continuous wave ("FMCW") module and at least a first part of the first transmission signal is an FMCW signal.

5. The fill level measurement device according to claim 4, wherein the first transmission signal has a second part which is a continuous wave ("CW") signal and wherein the fill level measurement device is configured to emit the first part of the first transmission signal only in the first direction and the second part of the first transmission signal only in the second direction.

6. The fill level measurement device according to claim 4, wherein the FMCW module is configured to generate a frequency-modulated transmission signal, which has a rising and a falling frequency ramp.

7. The fill level measurement device according to claim 1, wherein the processor unit is configured to determine the distance from the medium and the flow speed of the medium within a single measurement cycle.

8. The fill level measurement device according to claim 1, wherein the fill level measurement device is a fill level radar.

9. The fill level measurement device according to claim 1, wherein the fill level measurement device is a 2-wire line sensor.

10. The fill level measurement device according to claim 1, wherein the processor is configured to determine the flow direction of the medium.

11. The fill level measurement device according to claim 1, wherein the antenna arrangement includes a planar antenna array.

12. A non-transitory computer-readable medium on which a program element is stored which, when executed on a processor unit of a fill level measurement device, causes the fill level measurement device to carry out the steps of:

generating a transmission signal;

emitting the transmission signal in a first direction perpendicular to the flow direction of the medium and in a second direction different from the first direction;

determining whether the distance to the medium has changed by more than a predetermined threshold value over a predetermined period of time; and when the distance to the medium has changed by more than the predetermined threshold value over the predetermined period of time, determining the flow speed of the medium, wherein the distance from the medium and the flow speed of the medium are determined by evaluating the transmission signal reflected by the medium and received by an antenna arrangement of the fill level measurement device.

\* \* \* \* \*